United States Patent [19]

Campbell

[11] Patent Number: 4,693,282

[45] Date of Patent: Sep. 15, 1987

[54] LUBRICATING SYSTEM FOR A WEAVING MACHINE

[76] Inventor: Leonard Campbell, 209 Park Haywood, Greenville, S.C. 29607

[21] Appl. No.: 854,845

[22] Filed: Apr. 22, 1986

[51] Int. Cl.$^4$ .............................................. D03J 1/00
[52] U.S. Cl. ...................................... 139/1 R; 184/6; 184/55.1; 139/438
[58] Field of Search .................. 139/1 R, 45, 438; 184/6.26, 55 R, 55 A, 55.1, 55.2

[56]  References Cited
U.S. PATENT DOCUMENTS 4,117,869 10/1978 Rushman ............................ 139/1 R
4,205,708  6/1980 Burgbacher ....................... 139/1 R
4,343,378  8/1982 Bremer ............................... 139/1 R
4,444,292  4/1984 Brown et al. ...................... 139/1 R
4,518,019  5/1985 Hintsch et al. .................... 139/1 R Primary Examiner—Henry S. Jaudon
Attorney, Agent, or Firm—Julian W. Dority

[57]  ABSTRACT

A weaving machine having a lubricating system for lubricating the surface of picking instrumentalities during the operation of the weaving machine by supplying controlled droplets of lubricant in the amount of 0.01 through 0.05 cc at predetermined intervals and at consistent pressure in the range of from 50 to 300 psi.

7 Claims, 7 Drawing Figures

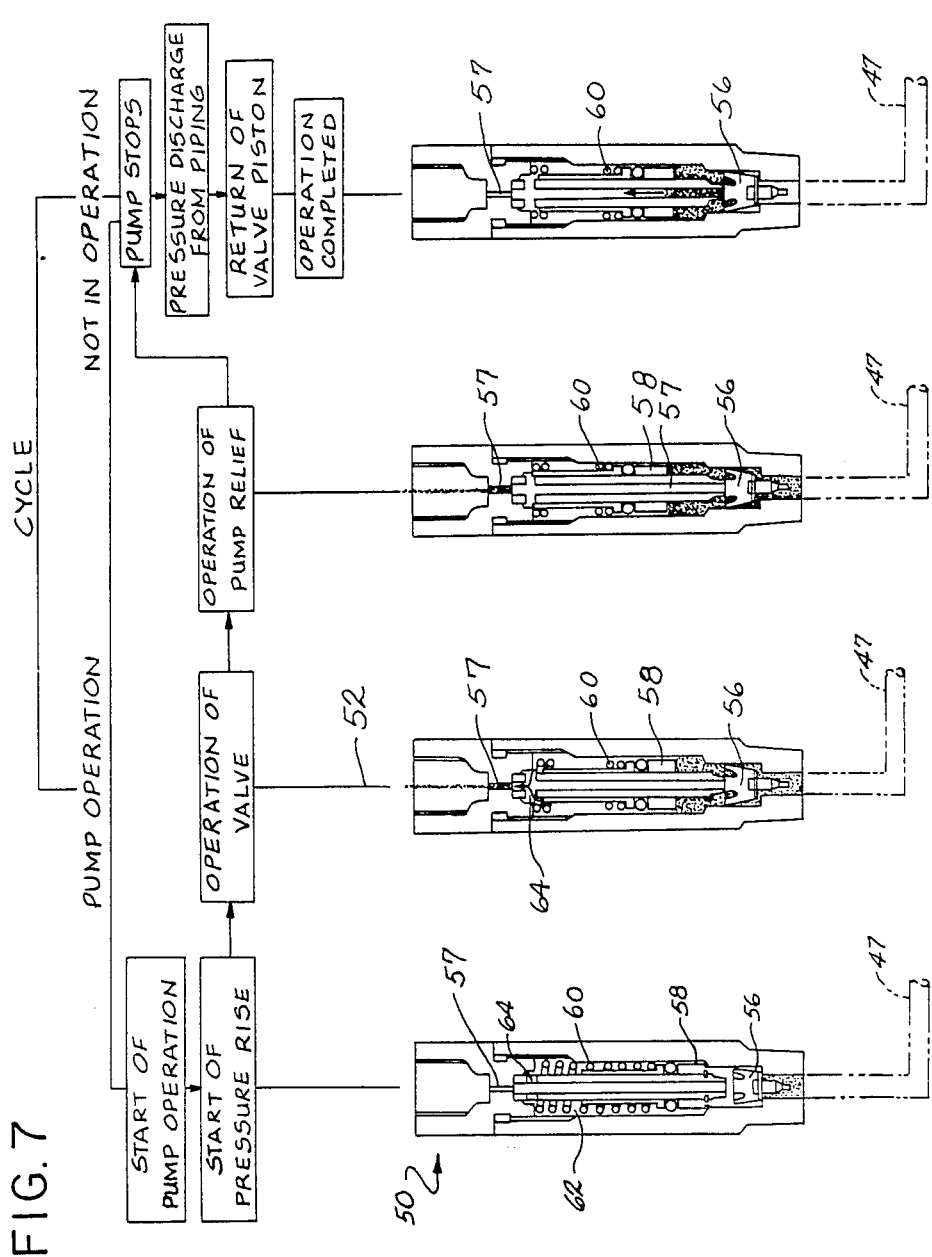

LUBRICATING SYSTEM FOR A WEAVING MACHINE

BACKGROUND OF THE INVENTION

This invention relates to a lubricating system for a weaving machine and particularly a system for lubricating the picking instrumentalities and the gripper projectile in a Sulzer loom.

Heretofor, weaving machines have been known to employ picking elements for picking a weft yarn into and through a shed of warp yarns. In many instances, the weft picking element has been guided through the shed by means of a series of guide elements mounted on the sley. Generally, the picking element or gripping projectile has been picked from a picking station on one side of the weaving machine to a catcher or catching station on the opposite side of the machine and, thereafter, returned from the catching station to the picking station, for example, by a chain conveying mechanism. Such weaving machines as those manufactured or sold by the Sulzer Brothers, Limited of Winterthur, Switzerland comprise weaving instrumentalities which are in frictional or rubbing contact with each other and which move relative to each other requiring means be provided to lubricate the contacting surfaces to prevent unnecessary wear of such surfaces.

In the past, such picking instrumentalities have been lubricated with airborne fine particles of lubricant supplied, for example, in the form of an oil mist to lubricate the various surfaces in friction of contact with each other. This has required an extensive amount of lubricant and has created the problem of contaminating the fabric being woven on the weaving machine and the atmosphere in the weaving room wherein such weaving machines are located. In a typical weaving room, there may be as many as 1,000 weaving machines operating simultaneously, each of which is contributing a portion of its lubricant mist to the atmosphere and causing unhealthy conditions for the operators of the machines.

Not only does the oil mist create unfavorable conditions for the operators and contaminate the fabric being woven on the weaving machines, they also use an excessive amount of lubricant or oil, which greatly increases the cost of operating the weaving machine. Furthermore, even with an excessive amount of lubricant being dispensed in the mist, there is still uneven lubrication of the frictional surfaces of the weaving machine. This causes undue wear on some of the parts and creates an additional expense for the owners of such weaving machines.

Some of the problems outlined above have been recognized by Sulzer Brothers, Limited and others active in the field of lubricating textile machines. However, their solutions have not been satisfactory. For example, Sulzer Brothers, Limited have sought to utilize a lubricant which is fed under low pressure in a continuous oil mist, in the belief that such low pressure mist will be localized in the areas of the machine where lubrication is desired. However, this has not obviated the problems. In addition, Sulzer Brothers, Limited have developed a lubricator for the picking element or gripper projectile as shown in U.S. Pat. No. 4,518,019 issued on May 21, 1985 and assigned to Sulzer Brothers, Limited. In this patent, a special lubricating station is provided for the gripper projectile whereby those surfaces which will come into contact with the weft guiding elements are supplied with a lubricant in the form of an oil mist or by a felt wicking surface, again, with the lubricant being under very low pressure, i.e., pressure having approximately 5 to 6 pounds per square inch.

Others have attempted to solve the problems created by the oil mist system by providing means to entrain or collect the oil mist away from the fabric and for separating the lubricant from the air stream collected. For example, U.S. Pat. No. 4,117,869 was issued on Oct. 3, 1978 and assigned to Parks Kramer Limited of London, England. This patent discloses a system of providing a vacuum hood over the area wherein the oil mist is created so as to draw the oil and air mist combination across the picking instrumentalities and into the vacuum stream formed, so as to limit the amount of lubricant that is deposited onto the fabric or into the general atmosphere around said weaving machine. This system has avoided some of the problems created by the oil mist lubricating system of Sulzer but still requires an excessive amount of lubricant and results in uneven lubrication of the moving parts of the weaving machine picking instrumentalities and still does not avoid completely the lubricant contaminating the general atmosphere and/or the fabric being formed on the weaving machine. In addition, the system disclosed in U.S. Pat. No. 4,117,869 adds greatly to the cost of the weaving machine.

In addition to the problems noted above in connection with prior art, each of the prior art systems utilize a very low pressure for their lubricant. While this may ease somewhat the contamination problem of the atmosphere and the fabric, it creates additional problems for the owners of the weaving machine. With the mist lubrication system, the ports delivering the oil mist often become contaminated with sizing and other dust, including lint from the fiber, so as to clog or stop up the mist distribution ports. With the low pressure, continuously fed oil mist, the pressure on the lubricant is insufficient to keep the ports open. Whenever the ports become stopped up, they will result in rapid deterioration of the contacting metal parts which fail to be lubricated. This causes excessive and rapid wear of these parts, necessitating expensive repairs or replacemnts of such parts.

SUMMARY OF THE INVENTION

The lubricating system constructed in accordance with the present invention, provides for positive lubrication of the parts in frictional contact with each other without contaminating the atmosphere around those parts or the general atmosphere of the weaving plant wherein such weaving machines are located. This is accomplished by providing a system which dispenses minute droplets of oil or other lubricants under high pressure at preselected intervals.

Accordingly, it is an important object of the present invention to provide a system for positive lubrication of the picking instrumentalities of a weaving machine without contaminating the fabric being woven on such weaving machines or contaminating the general atmosphere of the room in which such weaving machines are located.

Another important object of the present invention is to provide a lubricating system for weaving machines which will greatly increase the efficiency of the lubrication of the contacting surfaces and at the same time greatly reduce the amount of lubricant consumed during such lubrication.

Still another important object of the invention is to provide a weaving machine with a lubricating system which will avoid having the lubricant dispensing ports clogged or stopped up due to impurities such as dust, fiber, size, or the like, during the weaving machine operation.

BRIEF DESCRIPTION OF THE DRAWINGS

The construction of the lubricating system of the invention will be hereinafter described, together with other features thereof.

The invention will be more readily understood from a reading of the following specification, and by reference to the accompanying drawings forming an integral part thereof, wherein an example of the invention is shown and wherein:

FIG. 7 is a diagramatic illustration of the sequence of the system operation of the invention.

DESCRIPTION OF A PREFERRED EMBODIMENT

Figure 1:
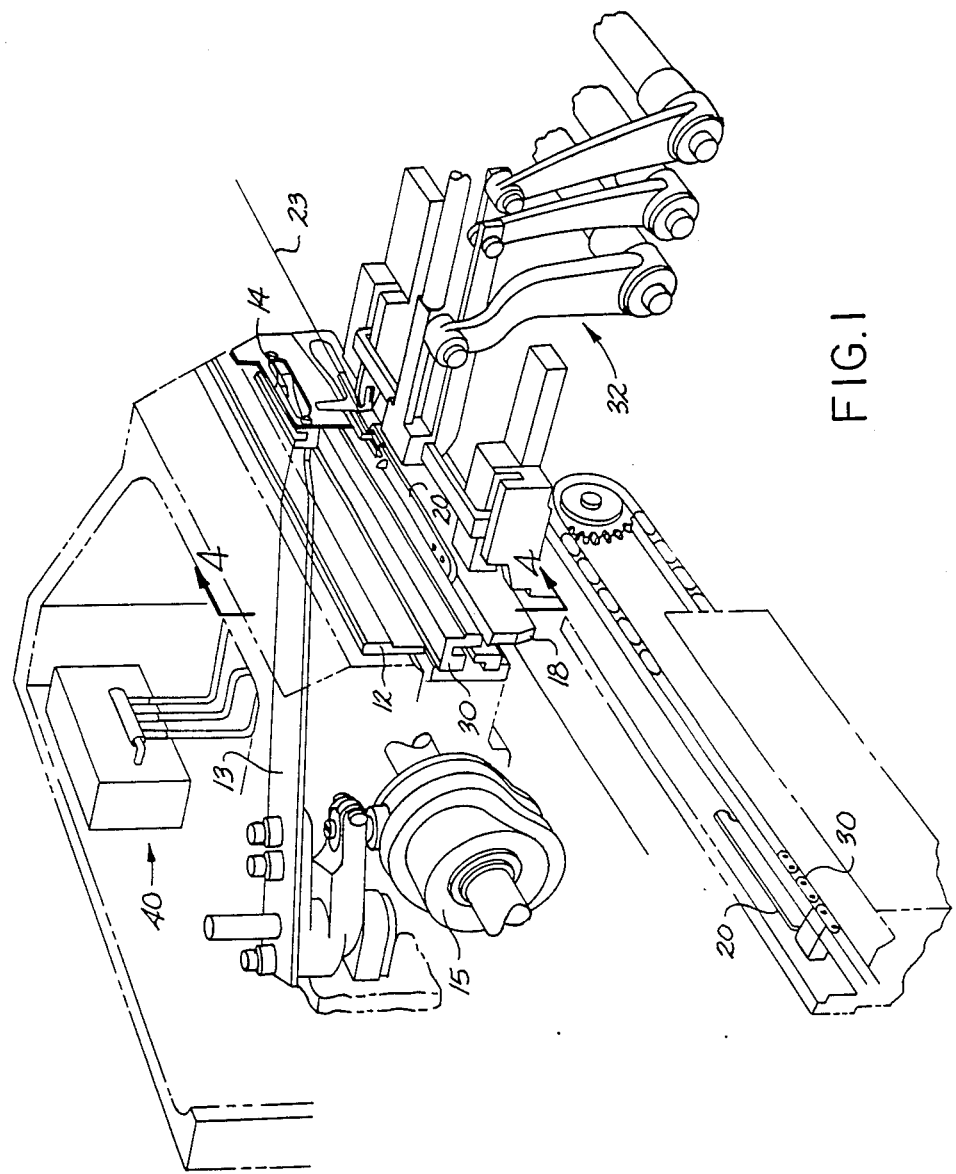
FIG. 1 is a perspective view illustrating the picking station of a weaving machine equipped with the lubrication system in accordance with the present invention.
Figure 2:
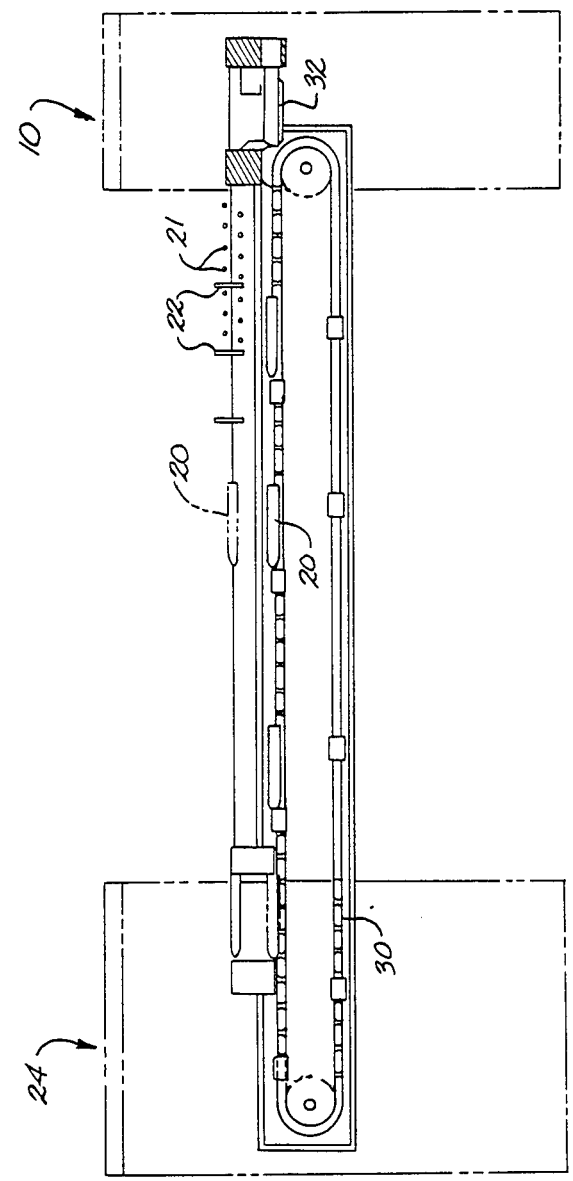
FIG. 2 is a diagramatic front cross sectional view of a weaving machine employing a lubrication system in accordance with the invention.
Figure 3:
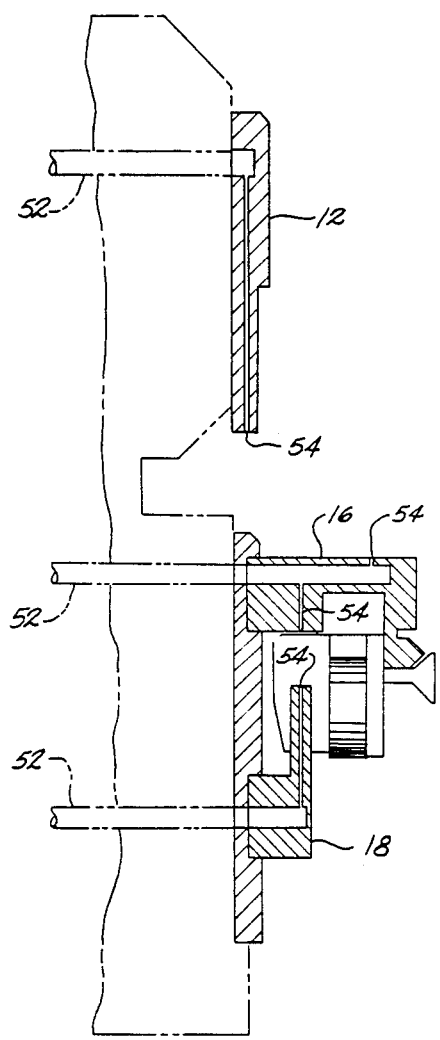
FIG. 3 is a cross sectional view taken along line IV—IV of FIG. 1 illustrating a number of the picking instrumentalities and the lubricating ports thereon in accordance with the invention.

Referring now to FIGS. 1, 2 and 3 of the drawings where there is illustrated various elements of a weaving machine. Such weaving machines employ a plurality of mechanisms with very fine or close tolerances in order to provide a precision weaving machine. FIGS. 1 and 3 illustrate picking station 10 which comprises a guide rail 12 for the weft feeder, a weft feeder 13 and a weft feeder slide 14 which is in sliding contact with rail 12. As the weft feeder feeds weft yarn 23 to a gripper projectile 20, the weft feeder slide must move very rapidly in contact with guide rail 12. Such weaving machine may, for example, insert as many as 400 or 500 picks per minute, which requires slide 14 to move along rail 12 once for each pick inserted. This requires accurate lubrication of the surfaces where slide 14 moves along guide rail 12.

Upper guide rail 16 for the projectile cooperates with lower guide rail 18 to apply lubricant to the gripper projectile while the projectile is in the loading or yarn feeding position. To this end, upper rail 16 and lower rail 18 are provided with discharge ports 54.

As best seen in FIG. 2, weaving machines of the Sulzer type are provided with a picking station 10 and a catching station 24, and projectile 20, after it is loaded with a filling or weft yarn 23, is fired across the weaving machine to the catcher through a warp shed formed by warp yarns 21 and also through a series of projectile guides 22 which enters the warp shed at spaced intervals across the entire width of the warp. Guides 22 serve to retain projectile 20 in the warp shed as it travels from the picking station to the catching station. After the projectile has traveled across the width of the weaving machine, it is received at the catching station and deposited onto a return chain mechanism and carried across the width of the weaving machine below the warp and back to the picking station. After it has completed its travel, the projectile is then lifted off of the chain by a gripper projectile lifter mechanism 32 which then deposits the projectile onto the weft feeding station for reloading with weft yarn, preparatory to the insertion of another pick into the warp shed.

Figure 4:
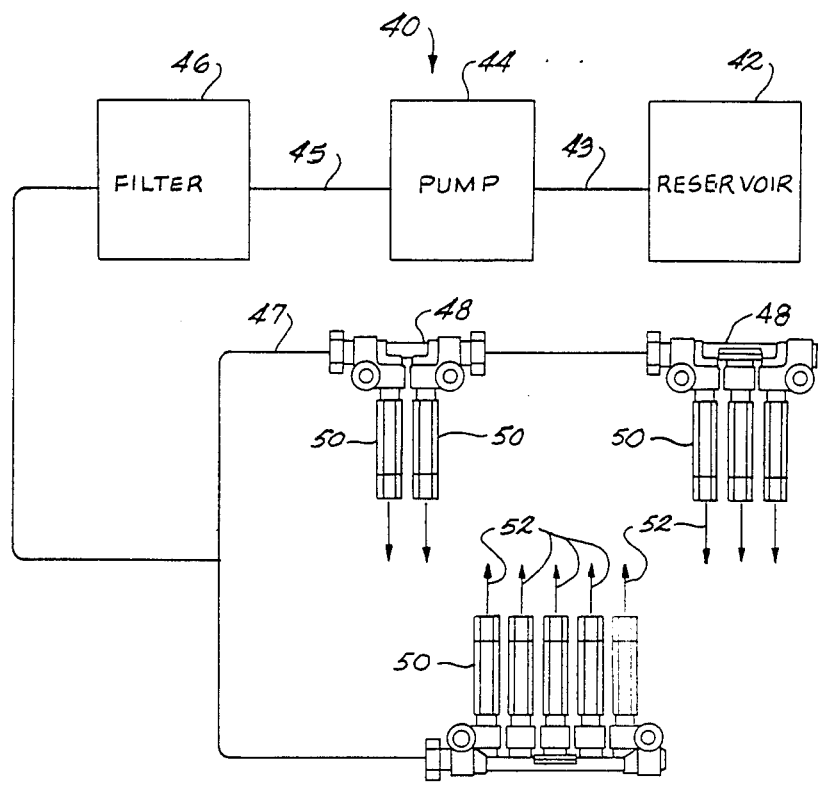
FIG. 4 is a diagramatical view of the lubrication system utilized with weaving machines of the invention.

As noted above, weaving machines of Sulzer type involve many closely fitting parts or mechanisms which slide relative to each other and this necessitates accurate and efficient lubrication of the surfaces that come into contact with each other and which move relative to each other. FIG. 4 illustrates diagramatically the lubrication system of the invention. The lubricating system of the invention comprises a lubricant reservoir 42 which holds oil or a synthetic lubricant, adapted to lubricate metal surfaces in rubbing contact with each other. The lubricants used in this system may have wide range of viscosity, from a low viscosity to a high one. The lubricant is fed from the reservoir via piping 43 to a pump 44.

Pump 44 may be of any type but the model AMO-150S, motor driven gear pump, manufactured by Lube Corporation and sold by Lube Eng., Inc. of Greenville, S.C. is preferred. Pump 44 conveys the oil or lubricant through piping 43 and piping 45 to a line filter 46 to filter out any impurities that may be present in the lubricant. After the lubricant passes filter 46, it continues through piping 47 to a plurality of junctions 48. Each of the junctions 48 is equipped with one or more flow metering valves 50 for delivering a predetermined amount of lubricant to delivery piping 52, and thence, to lubrication ports 54 on the surface to be lubricated.

The flow metering valve is a solid direct pressure operating type valve and is selected to deliver a predetermined quantity of lubricant for each stroke of this pump.

Details of the construction of this valve is shown in Figure 7, which also illustrates a sequence of operation for the pump and valve. Valve 50 is shown partially in section in each of Figures A, B C and D of FIG. 7. As the lubricant is delivered from the pump under pressure through piping 47, its pressure opens inlet valve 56, and at the same time closes the botom of center hole or bore 57, thereby permitting the lubricant to enter at the inlet valve to force piston 58 upward in opposition to the pressure of spring 60. As piston 58 rises to the position shown in B of FIG. 7, lubricant previously retained in the valve reservoir 62 is forced through opening 64 into bore 57 and thence into delivery piping 52 and thereby to the lubrication ports 54. After the pump stops its operation, its pressure releasing mechanism starts to work to lower the pressure exerted within the main piping. As the piston moves by the force of the spring set inside the fixed flow valve, pressure is created, moving inlet valve 56 to its original position to close the entrance to the valve and to permit the lubricant trapped between the valve surface and the piston surface to enter into the center bore 57 preparatory to the next stroke of the pump.

It is readily apparent that the flow metering valve, as described and illustrated herein is designed to deliver a predetermined constant amount of oil fluid or lubricant for each stroke of the pump. Flow metering valves of the type described and illustrated herein are available from Lube Eng. of Greenville, S.C.

In the present invention, these valves are chosen to deliver between 0.01 and 0.05 cc of lubricant for each stroke of the pump. In the present invention, the pump is chosen to deliver a pressure of between 50 to 300 psi and the flow metering valve is adapted to be opened by the pressure selected.

The pump utilized with the present invention in the preferred embodiment is a self-contained, motor driven gear pump with its own controller which has a discharge timer of 2 to 90 seconds and an interval timer of a range of 2 to 120 minutes. This pump delivers the lubricant at the rate of 150 cc per minute and can feed up to 100 lubrication ports, each of which will have exactly the same amount of lubricant delivered to its lubrication port each time. The lubricant delivered to the wear surfaces is precisely the amount necessary to prevent unnecessary wear and the pressure on the lubricant is chosen so as to prevent the ports from becoming clogged due to dust, lint or size particles generated by the weaving machine.

In the present invention, the flow metering valves are selected in order to deliver the precise amount lubricant necessary for the surface or surfaces which they are to lubricate. For example, the guide rails might require a greater amount of lubricant than would the projectile surfaces. With the present invention, the amount of lubricant delivered can be selected to deliver precisely the amount necessary to lubricate and there is no excess lubricant to contaminate the fabric being woven on the weaving machine or to contaminate the general atmosphere of the room in which such weaving machines are located. On the other hand, the surfaces needing lubrication are always precisely lubricated as predetermined.

Figure 6:
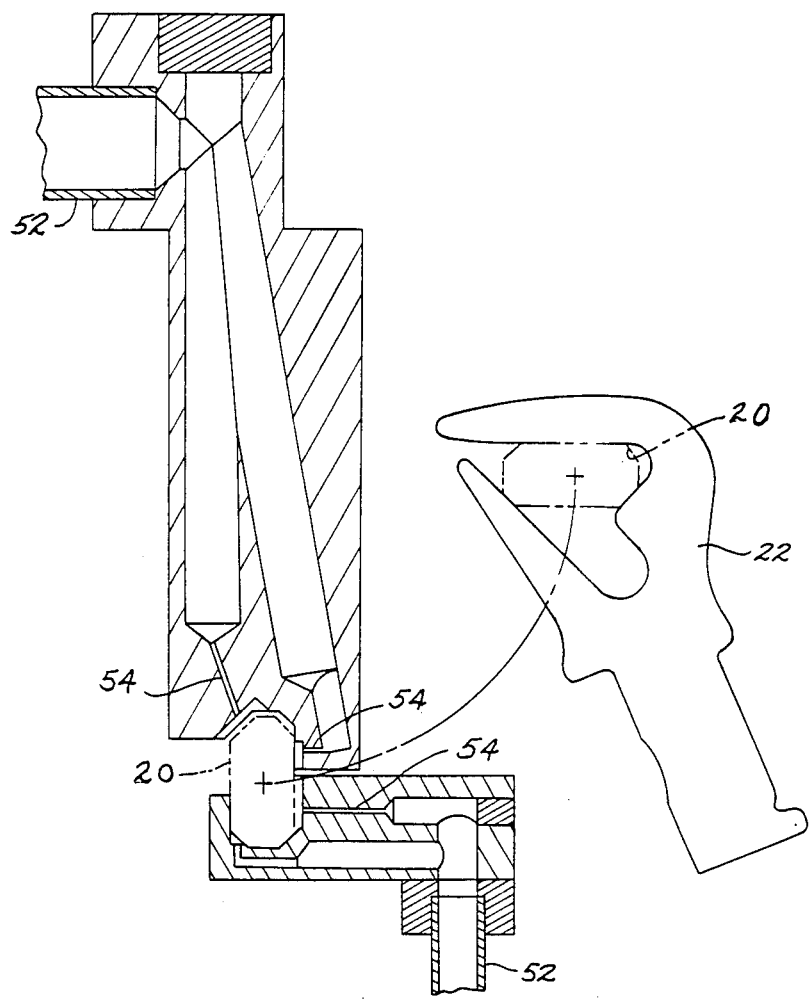
FIG. 6 illustrates a part cross sectional view of the ports for applying lubricant to surfaces of the gripper projectile and one of the projectile guides utilized to guide the projectile through the weft shed.

Referring now to FIG. 6, wherein there is illustrated an auxillary lubricator for the projectile itself, this lubricator is similar in construction to that shown in U.S. Pat. No. 4,518,019 and can be used with the lubrication system of the invention. The auxillary lubricator has ports 54 which are supplied a lubricant through piping 52 from the lubrication system of the invention. Ports 54 applies the lubricant in preselected, minute amounts to the surfaces of the projectile 20 which will come into contact with projectile guide members 22 during the flight of the projectile 20, across the warp shed for each pick inserted into the fabric.

Figure 5:
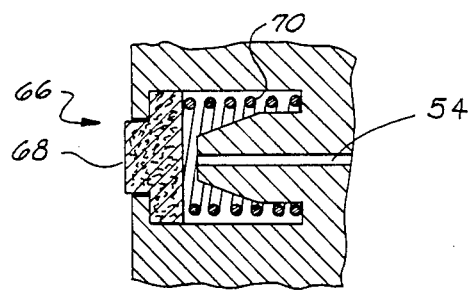
FIG. 5 illustrates an enlarged view of an alternate lubricant port utilizing a spring biased absorbent resilient member.

FIG. 5 shows an alternate form of lubrication port that is a wicking port 66 which comprises a felt wick 68. Wick 68 is spring loaded within the surface to be lubricated by sprain 70. Port 66 receives its lubrication from the lubricating system of the invention in the same way as do the preferred delivery ports 54.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed and illustrated.

I claim:

1. A textile fabric weaving machine comprising frame means, means mounted on said frame means for interweaving warp and weft yarns into fabric, comprising, picking instrumentalities which move relative to each other in frictional contact with each other and a gripper projectile for inserting weft yarns into a shed formed by said warp yarns and through a series of projectile guides, and means for lubricating the picking instrumentalities and the gripper projectile comprising a lubricant reservoir, a flow control valve, a pump and piping means for conveying lubricant from said reservoir to said flow control valve under a fluid pressure of between 50 and 300 psi, a lubricant delivery port in at least one of said instrumentalities for lubricating its surface and the surface of other instrumentalities in contact therewith, piping connectign said port to said flow control valve for conveying lubricant from said valve to said ports, and means to operate said pump to deliver drops of lubricant from 0.01 to 0.05 cc to said ports at preselected intervals.

2. A textile fabric weaving machine as set forth in claim 1 wherein the means for operating the pump causes the lubrication system to deliver lubricant to the selected surfaces at intervals of from one each minute to one for each 120 minutes.

3. A textile fabric weaving machine as set forth in claim 1 wherein the pressure of the lubricant within the flow metering valve is under 280 psi at the time the lubricant is discharged from said flow metering valve.

4. In combination with a weaving machine, having a plurality of guide elements for guiding a gripper projectile through a shed of warp yarns, each of said guide elements having a plurality of guide surfaces for slidingly contacting corresponding surfaces of the gripper projectile, a lubrication system comprising:
   means providing a passageway outside of said warp shed, having a plurality of guide surface for receiving a gripper projectile, said guide surfaces of said passage being complimentary to the surfaces of the gripper projectile;
   a plurality of lubricant ports in selected ones of said guide surface for delivering lubricant to the complimentary surfaces of the gripper projectile; and
   a supply system for delivering drops of lubricants ranging in size from 0.01 cc to 0.05 cc at predetermined intervals under a pressure of between 50 and 300 psi, whereby only those gripper projectile surfaces which will contact said guide element guide surfaces during a subsequent pick are lubricated prior to picking.

5. A combination as set forth in claim 4 wherein said lubricator further comprises a plurality of absorbent resilient members, each such member being disposed in a respective selected one of said guide surfaces and communicating with a respective lubricant supply piping to receive a supply of lubricant for transfer to the gripper porjectile.

6. A lubrication system for a weaving machine having a plurality of ports in a number of surfaces requiring lubrication, comprising:
   a lubrication reservoir;
   a flow metering valve for delivering drops of lubricant of between 0.01 and 0.05 cc;
   a pump connected by piping to said reservoir and said flow metering valve for conveying lubricant at a fluid pressure of between 50 and 300 psi from said reservoir to said flow metering valve at predetermined intervals; and
   piping connecting said flow metering valve to said ports for delivering lubricant thereto at said predetermined intervals, whereby said surfaces are adequately lubricated without contaminating the fabric being woven or the atmosphere surrounding the weaving machine.

7. A textile fabric weaving machine comprising frame means, means mounted on said frame means for interweaving warp and weft yarns into fabric, comprising, picking instrumentalities which move relative to each other in frictional contact with each other and a gripper projectile for inserting weft yarns into a shed formed by said warp yarns and through a series of projectile guides, and means for lubricating the picking instrumentalities and the gripper projectile comprising a lubricant reservoir, a flow control valve, a pump and piping means for conveying lubricant from said reservoir to said flow control valve under a fluid pressure of between 50 and 300 psi, a lubricant delivery port in at least one of said instrumentalities for lubricating its surface and the surface of other instrumentalities in cotact therewith, piping connecting said port to said flow control valve for conveying lubricant from said valve to said ports, and means to operate said pump to deliver drops of lubricant to said ports at preselected intervals.

* * * * *